United States Patent
Hultqvist

(10) Patent No.: US 6,619,303 B2
(45) Date of Patent: Sep. 16, 2003

(54) METHOD AND ARRANGEMENT FOR CLEANING FILTERS

(75) Inventor: Jan Hultqvist, Vic (AU)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,493

(22) Filed: Apr. 17, 2001

(65) Prior Publication Data

US 2001/0045222 A1 Nov. 29, 2001

(30) Foreign Application Priority Data

Apr. 17, 2000 (SE) .............................................. 0001412

(51) Int. Cl.⁷ ................................................ B08B 3/04
(52) U.S. Cl. ................................ 134/104.1; 134/115 R; 134/169 A
(58) Field of Search ........................... 134/104.1, 104.4, 134/111, 115 R, 201, 166 R, 169 R, 169 A; 210/275, 333.01, 427, 409, 411, 106, 107, 108

(56) References Cited

U.S. PATENT DOCUMENTS

| | | | | |
|---|---|---|---|---|
| 2,024,719 A | * | 12/1935 | Cocks et al. | |
| 2,046,770 A | * | 7/1936 | Coberly et al. | |
| 2,221,210 A | * | 11/1940 | Soderquist | |
| 3,016,147 A | * | 1/1962 | Cobb | |
| 3,061,100 A | * | 8/1962 | Fehlmann | |
| 3,233,549 A | * | 2/1966 | Howe | |
| 3,253,712 A | * | 5/1966 | Posgate | |
| 3,485,369 A | * | 12/1969 | Voorheis | |
| 3,512,644 A | * | 5/1970 | Nash | |
| 3,834,535 A | * | 9/1974 | Portyrata | |
| 4,487,689 A | * | 12/1984 | Galaj | |
| 4,608,157 A | * | 8/1986 | Graves | |
| 4,655,910 A | * | 4/1987 | Tabor | |
| 5,269,911 A | * | 12/1993 | Stegall, Sr. et al. | |
| 5,374,351 A | * | 12/1994 | Bolton et al. | |
| 5,423,977 A | * | 6/1995 | Aoki et al. | |
| 5,498,328 A | * | 3/1996 | Haddon | |
| 5,674,403 A | * | 10/1997 | Kinney | |
| 6,213,726 B1 | * | 4/2001 | Tuckey | |

FOREIGN PATENT DOCUMENTS

| | | | |
|---|---|---|---|
| DE | 19623150 A1 | | 12/1996 |
| EP | 0754851 A1 | | 1/1997 |
| EP | 1059430 A1 | | 12/2000 |
| JP | 55-020638 | | 2/1980 |
| JP | 3-169309 | * | 7/1991 |
| SU | 1176922 A | | 9/1985 |

* cited by examiner

Primary Examiner—Frankie L. Stinson
(74) Attorney, Agent, or Firm—Howrey Simon Arnold & White LLP

(57) ABSTRACT

The invention relates to a method and arrangement for cleaning filters in different types of liquid containers. The arrangement includes a pump (4) provided with a suction conduit (5) and which pump is connected to a filter (7) and an outlet conduit (3), whereby the components are placed in a sealed liquid container (1), and that the pump (4) can be reversed when a predetermined condition is fulfilled, whereby pollutants from said filter (7) is pumped to a collection unit (17) connected to said suction conduit (5).

13 Claims, 2 Drawing Sheets

METHOD AND ARRANGEMENT FOR CLEANING FILTERS

BACKGROUND OF THE INVENTION

Technical Field

The invention relates to methods and arrangements for cleaning filters and more specifically to those methods and arrangements that include a pump for pumping a liquid through a filter medium located within a sealed container, and in which the pump can be reversed when a predetermined condition is fulfilled so that pollutants from the filter are transported to a collection unit.

In many technical fields there exists a strong wish to reduce emissions and leakage of environmentally harmful vapors and liquids. Today a number of different pumps, filters and valves, placed outside a container or tank, are used when pumping a liquid from the container or tank. Traditionally this has been done to make the equipment easily accessible for service and replacement of components. A problem with this arrangement is that there are a multitude of joints and connections between the various components where emissions may escape.

An area of particular interest is vehicles, which are provided with a number of containers and tanks containing substances that are more or less harmful to the environment. One example is fuel tanks, where fuel is pumped from a tank to the engine via one or more valves and at least one fuel filter. A fuel filter may be a source of problems and requires regular changing or cleaning, if pollutants such as particles have been introduced into the tank.

Replacing such a filter often entails a leakage of fuel to the surroundings if the fuel line is not emptied of fuel prior to changing the filter, or if the change is not properly performed and results in leaking connections.

According to an alternative solution the filter can be cleaned without being removed. An example of how a filter may be cleaned in this way is disclosed in SU-A-1 176 922, which shows a separate pump that reverses the flow in the filter. Any pollutants are flushed into a collecting tank in which the polluted fuel may be taken care of. A drawback with this system is that a number of additional components, with corresponding connections, are required, all of which constitute a potential sources of leakage.

SUMMARY OF THE INVENTION

The problem is solved by using an arrangement for cleaning filters according to the attached claims. The arrangement includes a pump for pumping a liquid through a first filter and is placed within a sealed container whereby the pump can be reversed when a predetermined condition is fulfilled so that pollutants from the first filter are transported to a collection unit.

For certain operating conditions, the arrangement may also be provided with a pressure regulating valve arranged to limit the pressure of the delivered liquid.

By placing as many components as possible within the container, the problem of leakage to the surroundings can be minimized significantly, as the number of connections to the outside of the container is reduced to a minimum; for example, a filler pipe and an outlet conduit.

The pump has a first suction conduit for normal operation that is provided with a non-return valve preventing flow back into the container when the pump is reversed. When the filter is to be cleaned, a second suction conduit, connected between the pressure regulating valve and the first filter, is used, which conduit is provided with a second filter and a non-return valve preventing flow back into the container. In this embodiment, the liquid in the container itself is used for cleaning the filter. In order to prevent pollutants and particles from being sucked into the wrong side of the first filter, the second filter should be as fine as, or finer than the first filter.

According to an alternative embodiment, the second suction conduit may be connected from the outer wall of the container to a position between the pressure regulating valve and the first filter. In this way a pre-filtered fluid or a fluid having particular cleansing or pollutant dissolving properties can be flushed through the first filter, thus eliminating the need for a second filter.

It may not be suitable to flush pollutants and particles removed from the first filter directly back into the container. According to a further embodiment, the arrangement may be provided with a collection unit in the form of a third filter placed in the container. This filter is connected to the first suction conduit of the pump via a non-return valve preventing flow towards the pump. In order to collect as many pollutants and particles as possible from the first filter, the third filter should be as fine as, or finer than the first filter.

According to an alternative embodiment, the collection unit may be placed outside the container, whereby polluted liquid is pumped to the unit via a conduit connecting the suction conduit of the pump and the outer wall of the container. In this way pollutants may be removed from the container altogether and the third filer can be eliminated. In the case of the above-mentioned embodiment where the suction conduit is connected to the outer wall, alternative cleansing and dissolving fluids, which normally cannot be mixed with the liquid in the container in greater quantities, may be used. Both pollutants and solvents can then be pumped out of the container and be disposed of safely.

The timing for cleaning the filter may be chosen in several ways. According to one embodiment, pressure sensors are used to measure the pressure drop across the filter, whereby a control unit starts the cleaning procedure when the pressure drop exceeds a certain level. It is also possible to measure this power consumption required for maintaining a certain delivery pressure, whereby cleaning starts when the required power exceeds a set limit. If the container is a fuel tank for a vehicle, a further condition to be fulfilled is that the engine of the vehicle must be switched off.

An alternative embodiment is that the condition for cleaning is fulfilled when a predetermined amount of liquid has passed through the filter, which can be measured by means of a flow meter. If the container is a fuel tank for a vehicle, a further embodiment is that the condition is fulfilled when the vehicle has traveled a certain distance.

The invention also relates to a method for cleaning filters in a sealed container for liquids, by means of the above described embodiments.

BRIEF DESCRIPTION OF THE DRAWINGS

The invention will now be described in greater detail in the following way, by example only, and with reference to the attached drawings, in which.

DETAILED DESCRIPTION

In the following description, all references to direction of flow when describing placing of components are assumed to be those for normal operation of the system, when fluid is pumped from a container to a consumer or some other place of use, unless stated otherwise.

Figure 1:
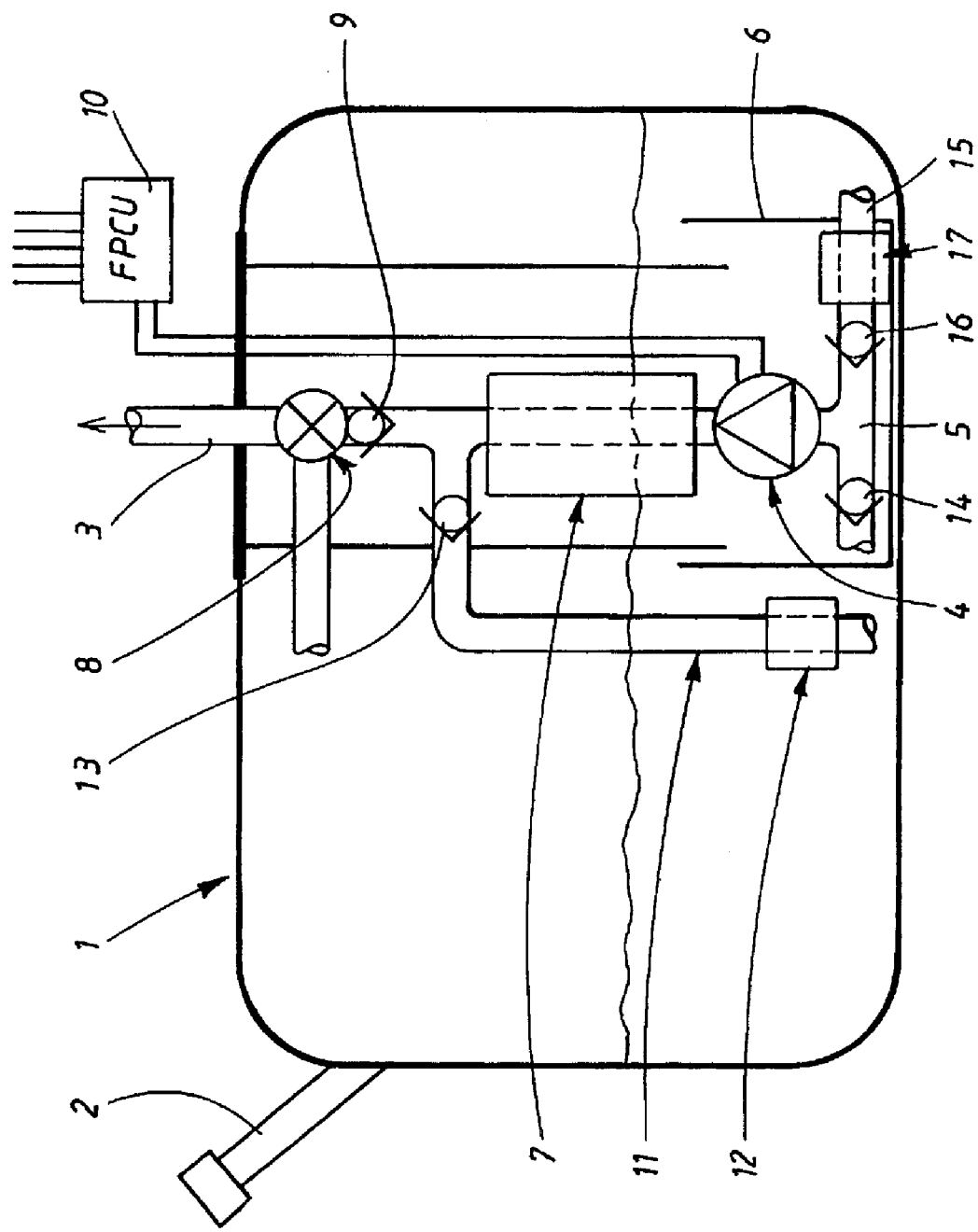
FIG. 1 shows an arrangement for cleaning a filter in a sealed container, wherein the components, including a collection unit for pollutants, are placed within the container.

An arrangement for cleaning a filter in a sealed container is shown in FIG. 1. This embodiment is particularly suited for fuel tanks for vehicles and shows a tank 1, which can be made from, for example, stainless steel, a double-walled composite material or other suitable materials. The tank 1 is provided with as few exterior connections as possible, in the illustrated case a filler pipe 2, a fuel line 3 and a canister system (not shown), and is permanently sealed by, for instance, welding after the necessary components have been mounted.

The tank is provided with a fuel pump 4 for pumping fuel from a suction conduit, in a so-called driveability reservoir 6 at the bottom of the tank, to a first filter 7. This filter 7 removes pollutants and particles which would otherwise clog or damage the fuel injection system of the vehicle. In this way particles down to a few micrometers in size may be removed. After the filter 7, the fuel passes through a pressure regulating valve 8 arranged to limit the pressure in the fuel line 3. During normal operation, fuel flows through the valve 8 to the fuel line, but if the fuel line pressure exceeds a set level, for instance due to variations in the momentary fuel consumption or a too high delivery pressure from the pump, the valve 8 will dump fuel back into the tank 1 via a return conduit. This example shows a pump 4 controlled by the demand for fuel, wherein an electronic control unit 10 controls the speed of the pump. During fluctuations of the fuel consumption of the engine, such as may occur during the early stages of engine braking, it will take a certain period of time for the control unit 10 and the pump 4 to react. Under such conditions the valve 8 will dump superfluous fuel back into the tank.

According to an alternative embodiment, the pump 4 can operate at a constant speed, whereby the pressure in the fuel line 3 is controlled by the pressure regulating valve 8. It is also possible to provide the fuel line with a non-return valve 9 to prevent reversal of the flow if a sudden pressure loss should occur. The non-return valve may be separate or be integrated with the pressure regulating valve.

An alternative positioning of the pressure regulating valve 8 is in the conduit 8a used for dumping the fuel back into the tank. In this case a separate non-return valve must be placed before the point where the return conduit 8a is connected to the fuel line 3.

Under certain conditions, a need for cleaning the fuel filter may arise. This can be performed routinely, as a part of the normal servicing of the vehicle, after a predetermined mileage, if pressure sensing devices in the filter indicates an abnormal pressure drop across the filter 7 or if the power consumption required by the pump for maintaining a set pressure in the outlet conduit exceeds a set level. In order to reverse the flow through the filter, it is of course necessary to switch off the engine.

When the fuel filter 7 is to be cleaned, the pump 4 is reversed. The oppositely directed flow will then remove pollutants and particles from the filter. As can be seen from FIG. 1, fuel from the tank itself is used for the cleaning process. Fuel is sucked from the tank 1 through a second suction conduit 11 and a second filter 12 to a connection between the first filter 7 and the pressure regulating valve 8. A non-return valve 9 can be placed immediately before the valve 8, should it become necessary to prevent flow from or through the valve 8 in the direction of the first filter 7. The second suction conduit is also provided with a non-return valve 13, preventing flow back to the tank during normal operation. The fuel will then pass through the first filter 7, whereby pollutants and particles will be drawn through the pump 4 and out into the suction conduit 5 of the pump. In order to prevent pollutants from being flushed back into the tank 1, the suction conduit 5 is provided with a non-return valve 14 preventing this. Instead, the polluted fuel will pass through an outlet conduit 15 connected between the pump 4 and the non-return valve 14 in the suction conduit 5. The outlet conduit 15 is also provided with a non-return valve 16, preventing flow in the direction of the pump 4, and a third filter 17 where pollutants and particles are collected. In order to prevent getting particles on the wrong side of the first filter 7, while at the same time collecting all pollutants removed from the first filter 7, the second and third filters 12, 17 respectively should be as fine as or finer than the first filter 7.

Figure 2:
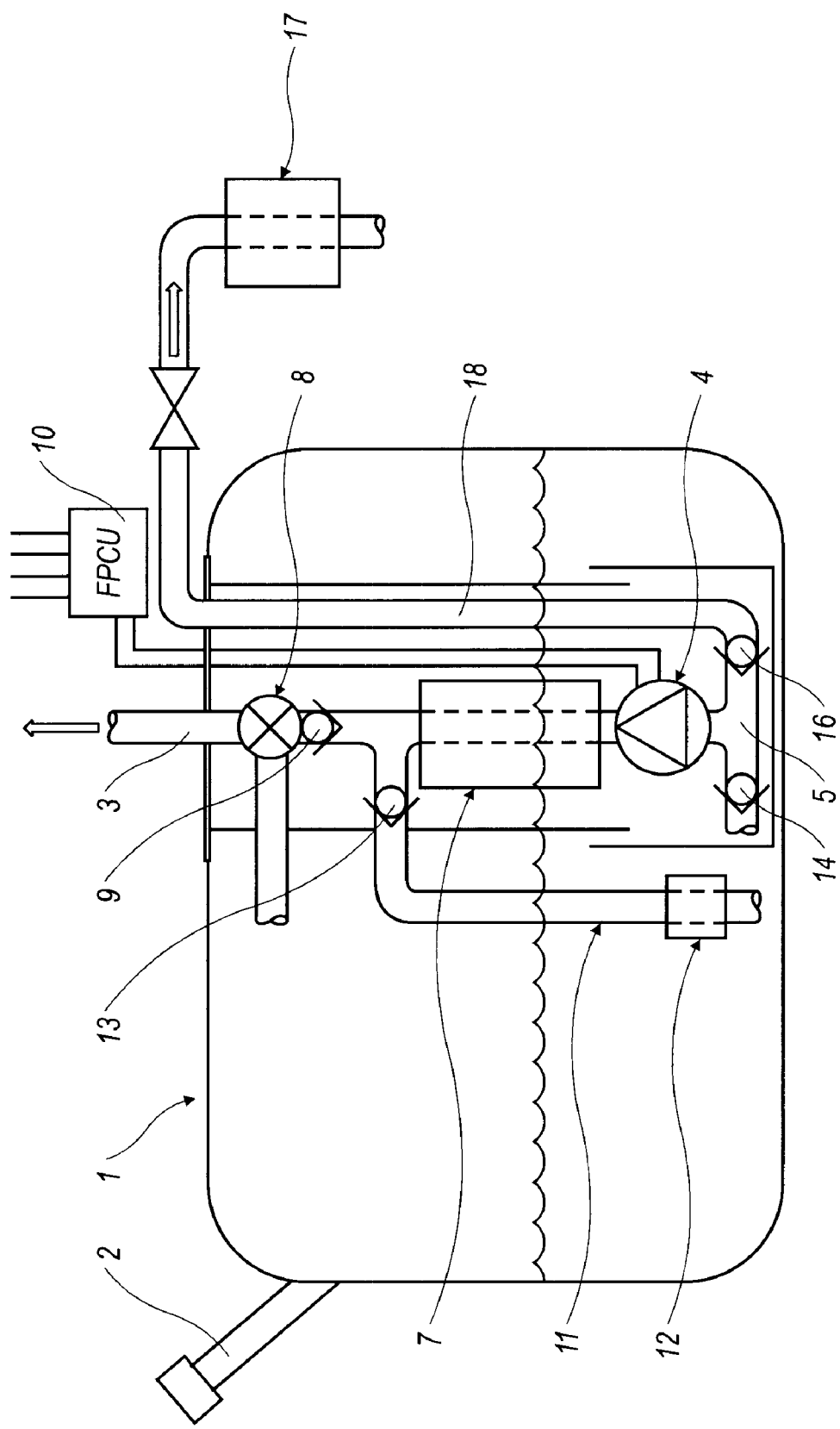
FIG. 2 shows an arrangement for cleaning a filter in a sealed container, wherein the components are placed within the container and are connected to an external collection unit for pollutants.

According to an alternative embodiment, shown in FIG. 2, the outlet conduit 18 can be connected to the outer wall of the tank 1. In this way the filter 17 in the outlet conduit 15 (FIG. 1) can be eliminated and pollutants can be removed from the tank and disposed of in an appropriate manner; for example, during servicing at a garage.

According to a further embodiment, the second suction conduit 11 can be connected between the outer wall of the tank 1 and a position between the pressure regulating valve 8 and the first filter 7. In this way pre-filtered liquid or liquid having particular cleansing or dissolving properties can be flushed through the first filter. The second filter can thus be eliminated.

The process for cleaning the fuel filter will start when one of the above mentioned conditions is fulfilled and, in the current example, when the engine of the vehicle is switched off. A signal from the control unit 10 for the pump 4 will start and reverse the pump, whereby fuel is sucked from the tank 1, through the second filter 12, to the fuel filter 7. The reversed flow will draw pollutants out of the filter 7, through the pump 4 and out through an outlet conduit 15 connected to the suction conduit 5 of the pump 4. Pollutants will be collected in the third filter 17 and the fuel is returned to the tank.

According to an alternative embodiment the polluted fuel can be pumped out of the tank 1 through a conduit 18 connected to the outer wall of the tank 1.

As the process will only be performed a limited number of times during the lifetime of the vehicle, the collecting filters 12, 17 are dimensioned so that they need never be changed. Using a permanently sealed tank means that all components making up the arrangement must be dimensioned to last the entire lifetime of the vehicle.

What is claimed is:

1. An arrangement for flushing an automotive fuel filter, said arrangement comprising:

a pump provided with a suction conduit and said pump being connected to a filter and an outlet conduit; and said pump, said suction conduit and said filter being placed in a fuel tank and configured so that when reversed in response to a predetermined condition, flushing action of said pump removes pollutants from said filter and delivers the pollutants to a collection unit connected to said suction conduit.

2. An arrangement for flushing an automotive fuel filter according to claim 1, wherein said collection unit is located outside said fuel tank.

3. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- the suction conduit further comprising a non-return valve whereby flow back into the container is prevented.

4. The arrangement according to claim 3, the pump further comprising a second suction conduit connected after the filter, the second suction conduit being used when the pump is reversed and having a second filter and a non-return valve whereby flow back into the container is prevented.

5. The arrangement according to claim 4, wherein the second filter is finer than the first filter.

6. The arrangement for cleaning filters according to claim 3 wherein the predetermined condition is met when a pressure drop across the filter exceeds a set limit.

7. The arrangement for cleaning filters according to claim 3 wherein the predetermined condition is met when a power consumption of the pump exceeds a set limit.

8. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- a pressure regulating valve arranged to limit the pressure of delivered fluid, the pressure regulating valve being placed in the outlet conduit between the filter and an outer wall of the container.

9. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- the pump further comprising a second suction conduit connected between an outer wall of the container and a position after the filter.

10. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- the collection unit further comprising a second filter placed in a tank, the second filter being connected to the suction conduit of the pump via an outlet conduit, with a non-return valve preventing flow back to the pump.

11. The arrangement for cleaning filters according to claim 10 wherein the second filter is as fine or finer than the first filter.

12. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- the collection unit being placed outside a tank, the pollutants being pumped to the collection unit via a conduit connected between the suction conduit of the pump and an outer wall of the container.

13. An arrangement for cleaning filters, the arrangement comprising:
- a pump having a suction conduit, the pump connected to a filter and an outlet conduit;
- wherein the pump, suction conduit and filter are placed in a sealed liquid container, the pump able to be reversed when a predetermined condition is met, thereby enabling pollutants from the filter to be pumped to a collection unit connected to the suction conduit; and
- the container further comprising a fuel tank for a vehicle, whereby the predetermined conditions is met when the vehicle has traveled a certain distance.

* * * * *